US010071372B2

United States Patent
Nitsch

(10) Patent No.: US 10,071,372 B2
(45) Date of Patent: Sep. 11, 2018

(54) PIPETTE FOR VOLUMETRICALLY METERING POWDER

(71) Applicant: Harro Hoefliger Verpackungsmaschinen GmbH, Allmersbach im Tal (DE)

(72) Inventor: Steffen Nitsch, Auenwald (DE)

(73) Assignee: Harro Hoefliger Verpackungsmaschinen GmbH, Allmersbach im Tal (DE)

( * ) Notice: Subject to any disclaimer, the term of this patent is extended or adjusted under 35 U.S.C. 154(b) by 378 days.

(21) Appl. No.: 14/943,798

(22) Filed: Nov. 17, 2015

(65) Prior Publication Data

US 2016/0067704 A1    Mar. 10, 2016

Related U.S. Application Data

(63) Continuation of application No. PCT/EP2014/001305, filed on May 14, 2014.

(30) Foreign Application Priority Data

May 17, 2013  (DE) .................... 20 2013 004 663 U

(51) Int. Cl.
   *B01L 3/02*  (2006.01)
   *G01F 11/10*  (2006.01)
   (Continued)

(52) U.S. Cl.
   CPC .............. *B01L 3/0217* (2013.01); *B65B 1/38* (2013.01); *G01F 11/10* (2013.01); *A61J 3/074* (2013.01); *B65B 1/36* (2013.01)

(58) Field of Classification Search
   CPC ..... B01L 3/02; B65B 1/38; B65B 1/04; G01F 11/10; G01F 11/02; G01N 1/00
   (Continued)

(56) References Cited

U.S. PATENT DOCUMENTS 4,999,164 A * 3/1991 Puchinger ............. B01L 3/0217
                                                        422/513
6,918,940 B1   7/2005 Lackey et al.
(Continued)

FOREIGN PATENT DOCUMENTS

DE        203 09 279 U1   10/2004
DE   20 2005 003 161 U1    5/2005

OTHER PUBLICATIONS

International Search Report dated Aug. 8, 2014 of international application PCT/EP2014/001305 on which this application is based.
(Continued)

*Primary Examiner* — Jonathan Dunlap
*Assistant Examiner* — Octavia Hollington
(74) *Attorney, Agent, or Firm* — Watler Ottesen, P.A.

(57) ABSTRACT

A pipette for volumetrically metering powder includes an outer metering casing enclosing a metering chamber. The metering casing defines a free end of the pipette whereat the metering casing forms an opening. The metering chamber has an opposite end lying opposite to the free end of the pipette and the opposite end of the metering chamber is delimited by an air-permeable retaining element. The retaining element is configured as a flexible filter defining a plane and having a back side facing away from the metering chamber. An air-permeable support core supports the filter at the back side thereof and is rigid transversely to the plane of the filter.

10 Claims, 1 Drawing Sheet

(51) Int. Cl.
*B65B 1/38* (2006.01)
*B65B 1/36* (2006.01)
*A61J 3/07* (2006.01)

(58) Field of Classification Search
USPC .............................. 73/864.11, 864.01, 864.14
See application file for complete search history.

(56) References Cited

U.S. PATENT DOCUMENTS 7,237,699 B2 * 7/2007 Zill ........................... B65B 1/16
222/189.06
8,763,653 B2 * 7/2014 Weigel ...................... B65B 1/36
141/12
9,310,239 B2 * 4/2016 Dietrich, Jr. .......... G01F 11/282

OTHER PUBLICATIONS

Translation of Written Opinion dated Nov. 17, 2015 of international application PCT/EP2014/001305 on which this application is based.

* cited by examiner

PIPETTE FOR VOLUMETRICALLY METERING POWDER

CROSS REFERENCE TO RELATED APPLICATIONS

This application is a continuation application of international patent application PCT/EP2014/001305, filed May 14, 2014, designating the United States and claiming priority from German application 20 2013 004 663.5, filed May 17, 2013, and the entire content of both applications is incorporated herein by reference.

BACKGROUND OF THE INVENTION

Certain applications depend on exact measurement of individual powder quantities which are intended to be removed from a store and poured in a predetermined quantity into a container, for example. In particular in the medical sphere, powdered medicines are poured into capsules, blister packs or metering devices. In order to exactly provide the active compound quantity required medically, metering tolerances have to be kept as small as possible.

Volumetric metering is in widespread use in order to obtain a high processing speed with simultaneously sufficient accuracy under industrial filling conditions. In addition to roller metering apparatuses or the like, use is made in particular of what are referred to as pipettes which comprise an outer metering casing. The metering casing surrounds a metering chamber in the circumferential direction, wherein the metering chamber has an opening at a free end of the pipette. Such a pipette is plunged with the opening in front into a powder bed. The metering chamber fills with the powder as the pipette is plunged in. The powder quantity predetermined by the volume of the metering chamber remains in the metering chamber when the pipette is drawn out of the powder bed. The powder can be transported by the pipette and poured out of the metering chamber into the designated container.

A differentiation is made between two types of pipette which are used depending on the properties of the powder to be metered. A "compaction pipette" is used in the case of powders having high binding forces. A metering piston is arranged here within the metering casing, the metering piston being axially displaceable relative to the metering casing and by means of which the volume of the metering chamber is initially set. When the compaction pipette is plunged in, the powder in the metering chamber is compacted. Cohesive forces and other binding forces between the powder grains and on the chamber walls automatically keep the powder in the metering chamber. At the final destination, the powder is injected into the target container by means of the metering piston. A problem here is that the powder has to displace the air located in the metering chamber as the powder penetrates the latter. It is possible for an air cushion to arise which results in metering inaccuracies.

In the case of powders having lower binding forces, automatic adhesion in the metering chamber is not ensured. The powder located in the metering chamber may drop out after the pipette is drawn out of the powder bed. In such cases, use is made of "vacuum pipettes". The metering chamber in this case is delimited by an air-permeable retaining element on the opposite side of its opening in the longitudinal direction. The metering chamber is charged through the retaining element with negative pressure which keeps the powder despite the small binding forces thereof in the metering chamber. The retaining element keeps the powder in the metering chamber counter to the applied negative pressure. At the final destination, instead of the negative pressure, a positive pressure is introduced through the retaining element into the metering chamber as a result of which the powder located there is blown out into the target container.

The air-permeable retaining element is customarily configured as a deep-bed filter consisting of a metal filter cloth with a certain thickness, a certain pore width and a certain mechanical load-bearing capacity. The pore width is matched to the grain size of the powder to be metered such that air, but not powder particles, can pass therethrough. When the vacuum pipette is plunged into the powder bed, the powder presses against the deep-bed filter. The deep-bed filter has to be able to withstand the pressure and also the powder contact pressure produced by the vacuum.

The manufacturing of such vacuum pipettes is cost-intensive since the condition of the deep-bed filters has to be checked after each manufacturing step. The deep-bed filter may be deformed transversely with respect to the plane thereof during the metering process because of the pressures which are in effect, and therefore changes in volume of the metering chamber and therefore metering weight differences occur. The metering accuracy which can be achieved is therefore limited. In addition, clogging of the metal filter cloth reduces the long term stability. If the previous metal filter cloth has been deformed or damaged by excessive forces, refabrication has been unavoidable.

SUMMARY OF THE INVENTION

It is an object of the invention to provide a pipette of the type described above in such a manner that metering accuracy, long term stability and costs are improved.

The pipette of the invention is for volumetrically metering powder including powdered medicines. The pipette includes: an outer metering casing enclosing a metering chamber in a peripheral direction; the metering casing defining a free end of the pipette whereat the metering casing forms an opening; the metering chamber having an opposite end lying opposite to the free end of the pipette; the opposite end of the metering chamber being delimited by an air-permeable retaining element; the retaining element being configured as a flexible filter defining a plane and having a back side facing away from the metering chamber; and, an air-permeable support core supporting the filter at the back side thereof and being rigid transversely to the plane of the filter.

According to the invention, the retaining element is configured as a flexible soft filter and in particular as a thin surface filter. The filter is supported on the rear side thereof which faces away from the metering chamber by an air-permeable supporting core which is rigid transversely with respect to the plane of the filter. The selected terms "flexible or flexurally soft" and "thin" mean here that a mechanical rigidity or flexibility transversely with respect to the filter plane has no technical significance since the compressive forces which are applied by the powder and act transversely with respect to the filter plane are not absorbed and supported by the filter, but rather by the supporting core located therebehind.

The support of the flexurally soft filter by means of the supporting core results in metering accuracy which is improved and is reliably present throughout the entire life cycle since the filter cannot yield and, as a result, the metering volume of the metering chamber once set is always maintained. In addition, the support permits the use of thin surface filters which are significantly more cost-effective than the deep-bed filters according to the prior art. In contrast to the deep-bed filters, the surface filters can be easily cleaned since clogging in the depth of the filter material can scarcely occur. Should this nevertheless take place, the surface filter as expendable material can easily be exchanged. The previously required checking for functional capability is omitted since a new filter is or at least can be used in each setup. In addition, it is easily possible to adapt an existing pipette to various types of powder. The easy exchangeability makes it possible to install filters of different pore size (for example 0.4 µm or 1 µm) depending on the product.

The pipette according to the invention is advantageously configured as a vacuum pipette. The powder which can be metered can readily be drawn up here at any suitable or required negative pressure and kept in the metering chamber without there being the risk of a change in volume due to transverse forces acting on the filter. At the final destination, the powder can easily be blown out by the constructional unit comprised of filter and supporting core. The vacuum pipette is subsequently available again with the exactly identical metering volume for the next metering cycle.

In an advantageous alternative, the pipette according to the invention can be configured as a compaction pipette. By means of the support by the supporting core, the filter itself withstands the high compaction pressures. The use of negative and positive pressure is not required here. Nevertheless, the air permeability of the constructional unit comprised of filter and supporting core is used to vent the metering chamber when the pipette is plunged into the powder bed. The quantity of air previously present in the metering chamber can easily be displaced without it being possible for an interfering air cushion to be formed, and therefore the metering accuracy is increased.

In a preferred embodiment, a metering piston is arranged within the metering casing, the metering piston being axially displaceable in relation to the metering casing and to that end of the metering piston which faces the metering chamber the filter is fastened by means of a cap nut. The volume of the metering chamber can easily be set via the axial displaceability of the metering piston. Alternatively or additionally, the metering piston can be used in the compaction pipette to eject the metered quantity of powder. The fastening of the constructional unit consisting of filter and supporting core by means of the cap nut can be realized easily and cost-effectively, wherein an exact setting of the volume is obtained. If required, the filter can easily be replaced. The cap nut can be configured as desired geometrically, in particular on the side thereof facing the metering chamber, and can therefore be flexibly adapted to the use requirements.

However, it may also be practical to dispense with the axial displaceability of the metering piston if, for example in the case of a vacuum pipette, the ejection function is not required and a fixedly set metering volume suffices. In this case, a mounting sleeve instead of the metering piston is arranged within the metering casing, the filter being fastened by means of a cap nut to that end of the mounting sleeve which faces the metering chamber. The other functions and advantages correspond to those of the metering piston described above.

In an advantageous embodiment, the cap nut is flushly adjacent to a peripheral wall formed by the metering casing and, as viewed in cross section, has an oblique surface extending from the filter as far as the peripheral wall. In a preferred configuration as a rotational element, the oblique surface is conical. This avoids dead angles in the metering chamber, in which powder residues could remain stuck. The ejected quantity of powder corresponds exactly to the metering volume predetermined by the geometry of the metering chamber.

In a preferred alternative, the cap nut is flushly adjacent to a peripheral wall formed by the metering casing and has a flat end surface which lies in a common plane with the filter. The cap nut does not have an interfering effect here on the contour of the metering chamber. A metering chamber kept simple geometrically and having an exactly defined volume and little risk of powder residues remaining stuck is produced.

The supporting core may be a porous sintered component or the like. The supporting core is preferably configured as a solid body with air ducts formed therein. The air ducts or air channels permit directed and therefore effective blowing of the powder out of the metering chamber. In particular, it can be practical that at least some of the air ducts are directed outward in a fan-shaped manner toward the peripheral wall of the metering chamber. For example, in conjunction with the above-described oblique surface of the cap nut, the radially outer regions of the metering chamber can also be reliably and efficiently blown out.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
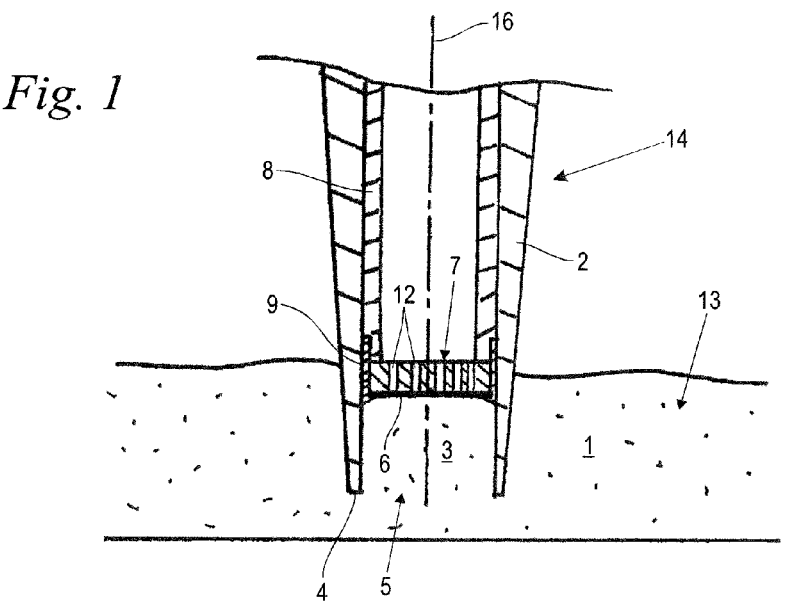
FIG. 1 shows, in a schematic longitudinal section view, an embodiment of a pipette according to the invention with an outer metering casing which surrounds a metering chamber in the circumferential direction, and with a thin surface filter which is supported on the rear side thereof facing away from the metering chamber by means of an air-permeable and rigid supporting core, wherein the supporting core has axially parallel air ducts.

FIG. 1 shows, in a schematic longitudinal section view, a first embodiment of a pipette 14 according to the invention. The pipette 14 is provided and configured in a manner described in more detail further below for volumetrically metering powder 1, in particular powdered medicine. The pipette 14 extends along a longitudinal axis 16, which is oriented vertically during operation, and comprises an outer metering casing 2 which surrounds a metering chamber 3, with respect to the longitudinal axis 16, in the circumferential direction. The metering casing 2 has an opening 5 at a free end 4. Opposite the opening 5 in the axial direction, an air-permeable retaining element in the form of a filter 6 is arranged within the metering casing 2. The metering chamber 3 is therefore delimited radially outwardly by the rigid metering casing 2 and in the axial direction firstly by the opening 5 and secondly by the filter 6 and is exactly defined with respect to the volume thereof.

For the metering operation, powder 1 is kept ready in a powder bed 13. The pipette 14 is plunged with the opening 5 thereof pointing downward into the powder bed 13, with the metering chamber 3 being filled with powder 1 through the opening 5. The pipette 14 is subsequently drawn vertically upward out of the powder bed 13, with a quantity of powder corresponding in terms of volume to the volume of the metering chamber 3 remaining in the metering chamber 3. The pipette 14 is moved in this state to the final destination and the metered quantity of powder is transferred from the metering chamber into a target container, for example.

In the configuration according to the invention, the retaining element is configured as a flexurally soft filter 6. The filter 6 can be a flexible deep-bed filter and, in the preferred embodiment shown, is configured as a thin surface filter. The filter 6 is supported on its rear or upper side which faces away from the metering chamber 3 by means of an air-permeable supporting core 7 which is rigid transversely with respect to the plane of the filter 6. The supporting core 7 can be composed, for example, of a porous sintered material. In the preferred embodiment shown, the supporting core 7 is configured as a solid body with air ducts 12 formed therein. The air ducts 12 lie parallel here to the longitudinal axis 16 and, through the filter 6, form a pressure- and flow-transmitting connection between the metering chamber 3 and the opposite rear side of the supporting core 7.

A mounting sleeve is arranged within the metering casing 2, the filter 6 and also the supporting core 7 being fastened in the form of a stack lying directly one above another by means of a cap nut 9 to that end of the mounting sleeve which faces the metering chamber 3. The mounting sleeve can be mounted in an axially fixed position within the metering casing 2, thus producing a fixedly set volume of the metering chamber 3. This may be practical, for example, when the pipette 14 is configured as a vacuum pipette. In this case, by means of a negative pressure source (not illustrated), a negative pressure is built up within the metering casing 2 or within the mounting sleeve, the negative pressure drawing up the powder 1 from the powder bed 13 through the supporting core 7 and the filter 6 into the metering chamber 3 and securely holding the powder therein. The powder 1 is retained here by the filter 6, that is, cannot pass through the filter 6. After the quantity of powder metered in this manner is raised and after same is transported to the final destination, the powder 1 can be blown out of the metering chamber 3 into a target container (not illustrated) by a positive pressure being applied instead of the above-described negative pressure. The positive pressure acts through the supporting core 7 and the filter 6 on the powder 1 located in the metering chamber 3 and blows the powder out.

The above-described mounting sleeve is preferably formed so as to be axially displaceable in relation to the metering casing 2 and thereby becomes a metering piston 8. In conjunction with the vacuum pipette mentioned, the desired volume of the metering chamber 3 can be set by suitably setting the axial position of the metering piston 8 relative to the metering casing 2.

As an alternative to the above-described vacuum pipette, the pipette 14 shown may also be configured and used as a compaction pipette. In this case, the use of negative and positive pressure is dispensed with. The compaction pipette is plunged into the powder bed 13, with the powder entering the metering chamber 3 through the opening 5. In the process, the powder 1 is compacted and only as a result of the binding forces thereof is secured in the metering chamber 3. The function of the metering piston 8 for setting the volume of the metering chamber is maintained. With features and reference signs otherwise being identical, there is also the function of ejecting the powder 1 at the final destination out of the metering chamber 3 into the target container (not illustrated) by means of an axial movement of the metering piston 8. The ejection function can also be used in the vacuum pipette as a supplement or alternatively to the blowing-out operation.

Figure 2:
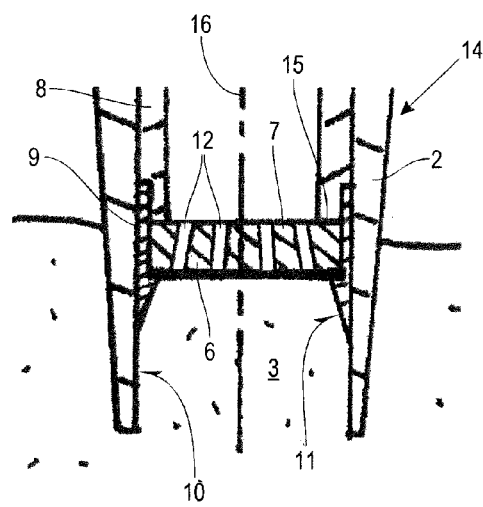
FIG. 2 shows, in an enlarged detailed view, a variant of the arrangement according to FIG. 1 in which a cap nut for fastening the retaining membrane and the supporting core is formed with an extended oblique surface, wherein some of the air ducts formed in the supporting core are directly outward in a fan-shaped manner toward the peripheral wall of the metering chamber; and, FIG. 3 shows a variant of the arrangement according to FIG. 2 in which the supporting core is formed with an oblique surface, and in which the cap nut has a flat end surface on the side thereof which faces the metering chamber.

FIG. 2 shows, in an enlarged detailed view, a variant according to the invention of the pipette 14 according to FIG. 1, wherein only the region of the metering chamber 3 is shown here for the sake of better clarity. As in the embodiment according to FIG. 1, the metering piston 8 has, on the free end side thereof, a circular-ring-shaped contact surface 15 and an external thread adjoining the latter. The annular cap nut 9 is screwed onto the external thread of the metering piston 8 and in the process braces the stack consisting of filter 6 and supporting core 7 against the contact surface 15 of the metering piston 8.

On the peripheral side, the cap nut 9 bears without a gap and flush against a peripheral wall 10 formed by the metering casing 2. As viewed in cross section, the cap nut 9, on the side thereof facing the metering chamber 3, has an oblique surface 11 extending from the filter 6 as far as the peripheral wall 10. Since the pipette 14 is configured as a whole as a rotational element with respect to the longitudinal axis 16 thereof, the oblique surface 11 forms a downwardly open cone extending from the filter 6 to the peripheral wall 10.

In the region of the metering chamber 3, here in the region of the oblique surface 11, the cap nut can be configured virtually freely and in a manner meeting requirements. From the direct comparison of FIGS. 1 and 2, it is revealed, for example, that the oblique surface 11 in FIG. 1 is configured to be only very short and, in FIG. 2, to be comparatively much longer. The opening angle of the conical oblique surface is considerably less than 45° and in particular less than 30°. In addition, in the embodiment according to FIG. 2, in a departure from FIG. 1, at least some of the air ducts 12, here all of the air ducts 12, are not arranged axially parallel but rather are directed outward in a fan-shaped manner toward the peripheral wall 10 of the metering chamber 3. The radially outer air ducts 12 therefore run at least approximately parallel to the oblique surface 11 and therefore permit the latter to be blown free in a directed manner of powder residues.

Figure 3:
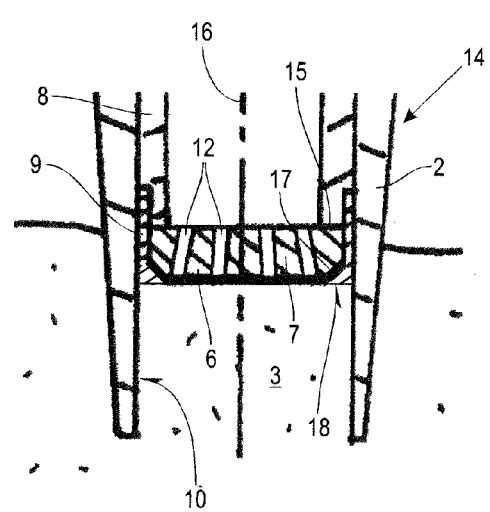

FIG. 3 shows a further embodiment according to the invention in an enlarged detailed schematic analogous to FIG. 2. The cap nut 9 here does not have an oblique surface 11 facing the metering chamber 3 (FIG. 2) but rather a flat end surface 18 which, like the filter 6, lies perpendicularly to the longitudinal axis 16 and also in a common plane with the filter 6. This creates a cylindrical metering chamber 3. In order to hold the filter 6 on the supporting core 7 and to hold both together on the contact surface 15 of the metering piston 8, a conically encircling oblique surface 11 is formed on the supporting core 7, against which oblique surface a corresponding formation of the cap nut 9 presses with the interposition of the flexible filter 6.

Unless described or graphically illustrated differently, the embodiments according to FIGS. 1, 2 and 3 correspond in the remaining features and reference numerals.

It is understood that the foregoing description is that of the preferred embodiments of the invention and that various changes and modifications may be made thereto without departing from the spirit and scope of the invention as defined in the appended claims.

What is claimed is:

1. A pipette for volumetrically metering powder including powdered medicines, the pipette comprising:

an outer metering casing enclosing a metering chamber in a peripheral direction;

said metering casing defining a free end of said pipette whereat said metering casing forms an opening;

said metering chamber having an opposite end lying opposite to said free end of said pipette;

said opposite end of said metering chamber being delimited by an air-permeable retaining element;

said retaining element being configured as a flexible filter defining a plane and having a back side facing away from said metering chamber;

an air-permeable support core supporting said filter at said back side thereof and being rigid transversely to said plane of said filter;

a metering piston arranged within said metering casing so as to be axially displaceable relative thereto;

said metering piston having an end facing toward said metering chamber; and, a cap nut configured to attach said filter to said end of said metering piston.

2. The pipette of claim 1, wherein said filter is a surface filter.

3. The pipette of claim 1, wherein:

said metering casing defines a peripheral wall;

said cap nut borders surface-flush on said peripheral wall; and, said cap nut, when viewed in section, defines an inclined surface extending from said filter up to said peripheral wall.

4. The pipette of claim 1, wherein:

said metering casing defines a peripheral wall;

said cap nut borders surface-flush on said peripheral wall;

said cap nut further defines a planar end face; and, said planar end face of said cap nut and said filter conjointly define a common plane.

5. The pipette of claim 1, wherein said pipette is configured as a vacuum pipette.

6. The pipette of claim 1, wherein said pipette is configured as a compaction pipette.

7. A pipette for volumetrically metering powder including powdered medicines, the pipette comprising:

an outer metering casing enclosing a metering chamber in a peripheral direction;

said metering casing defining a free end of said pipette whereat said metering casing forms an opening;

said metering chamber having an opposite end lying opposite to said free end of said pipette;

said opposite end of said metering chamber being delimited by an air-permeable retaining element;

said retaining element being configured as a flexible filter defining a plane and having a back side facing away from said metering chamber;

an air-permeable support core supporting said filter at said back side thereof and being rigid transversely to said plane of said filter;

an assembly sleeve arranged within said metering casing and having an end facing toward said metering chamber; and, a cap nut configured to attach said filter to said end of said assembly sleeve.

8. The pipette of claim 7, wherein:

said metering casing defines a peripheral wall;

said cap nut borders surface-flush on said peripheral wall; and, said cap nut, when viewed in section, defines an inclined surface extending from said filter up to said peripheral wall.

9. The pipette of claim 7, wherein:

said metering casing defines a peripheral wall;

said cap nut borders surface-flush on said peripheral wall;

said cap nut further defines a planar end face; and, said planar end face of said cap nut and said filter conjointly define a common plane.

10. A pipette for volumetrically metering powder including powdered medicines, the pipette comprising:

an outer metering casing enclosing a metering chamber in a peripheral direction;

said metering casing defining a free end of said pipette whereat said metering casing forms an opening;

said metering chamber having an opposite end lying opposite to said free end of said pipette;

said opposite end of said metering chamber being delimited by an air-permeable retaining element;

said retaining element being configured as a flexible filter defining a plane and having a back side facing away from said metering chamber;

an air-permeable support core supporting said filter at said back side thereof and being rigid transversely to said plane of said filter;

said support core is configured as a massive body having a plurality of air channels formed therein;

said outer metering casing defining a peripheral wall enclosing said metering chamber; and, at least a portion of said air channels being inclined fan-like to said peripheral wall enclosing said metering chamber.

* * * * *